United States Patent
Seta et al.

(10) Patent No.: US 11,337,404 B2
(45) Date of Patent: May 24, 2022

(54) VEHICLE, VENTILATION SYSTEM, AND METHOD FOR TRANSPORTING PETS

(71) Applicant: THE BOEING COMPANY, Chicago, IL (US)

(72) Inventors: Amar Seta, Everett, WA (US); Sun Min Jung, Everett, WA (US); John A. Lepore, Hazelwood, MO (US)

(73) Assignee: THE BOEING COMPANY, Chicago, IL (US)

( * ) Notice: Subject to any disclaimer, the term of this patent is extended or adjusted under 35 U.S.C. 154(b) by 972 days.

(21) Appl. No.: 15/886,498

(22) Filed: Feb. 1, 2018

(65) Prior Publication Data
US 2019/0233112 A1    Aug. 1, 2019

(51) Int. Cl.
| | | |
|---|---|---|
| *A01K 1/00* | (2006.01) | |
| *B64D 11/00* | (2006.01) | |
| *A01K 1/02* | (2006.01) | |
| *B64D 13/06* | (2006.01) | |

(52) U.S. Cl.
CPC .......... *A01K 1/0236* (2013.01); *A01K 1/0047* (2013.01); *B64D 11/00* (2013.01); *B64D 13/06* (2013.01); *B64D 2013/0651* (2013.01)

(58) Field of Classification Search
CPC .. A01K 1/0245; A01K 1/0236; A01K 1/0272; A01K 1/0035; A01K 1/0058; A01K 1/0064; A01K 1/0107; A01K 1/029; A01K 1/03; A01K 1/033; A01K 1/034; A01K 29/005; B64D 9/003; F24F 2013/242; F24F 8/10

USPC ....... 119/496, 500, 497, 416, 474, 481, 498, 119/501, 771; 312/236
See application file for complete search history.

(56) References Cited

U.S. PATENT DOCUMENTS

| | | | | |
|---|---|---|---|---|
| 3,919,978 A | * | 11/1975 | Schaefer | A01K 1/031 119/500 |
| 4,343,261 A | * | 8/1982 | Thomas | A01K 1/031 119/418 |
| 4,878,359 A | * | 11/1989 | Mandell | A01K 1/0236 62/239 |

(Continued)

OTHER PUBLICATIONS

Corresponding U.S. Appl. No. 15/627,505, filed Jun. 20, 2017 (43 pages).

(Continued)

*Primary Examiner* — Yvonne R Abbott-Lewis
(74) *Attorney, Agent, or Firm* — The Small Patent Law Group LLC; Philip S. Hof

(57) ABSTRACT

A vehicle includes a passenger cabin, a monument, a pet travel system, and a ventilation system. The pet travel system includes at least a portion of the monument and at least one pet storage module configured to be received in the portion of the monument. The ventilation system includes an inlet port defined in the at least one pet storage module, an exhaust port defined in the at least one pet storage module, and an exhaust duct. The inlet port is in flow communication with an air source outside of the pet travel system. The exhaust duct is in flow communication with the exhaust port. The pressure within the exhaust duct is lower than the pressure of the air source to cause air to flow from the air source through the at least one pet storage module from the inlet port to the exhaust port.

20 Claims, 9 Drawing Sheets

(56) References Cited

U.S. PATENT DOCUMENTS

| | | | | |
|---|---|---|---|---|
| 5,134,972 A * | 8/1992 | Compagnucci | A01K 1/0047 | 119/165 |
| 5,727,503 A * | 3/1998 | Whittaker | A01K 1/0236 | 119/500 |
| 5,954,013 A * | 9/1999 | Gabriel | A01K 1/031 | 119/419 |
| 6,457,437 B1 * | 10/2002 | Frasier | A01K 1/031 | 119/419 |
| 6,523,499 B1 * | 2/2003 | Chrisco | A01K 1/0245 | 119/496 |
| 7,036,457 B2 * | 5/2006 | Uchiyama | A01K 1/031 | 119/419 |
| 7,363,879 B2 * | 4/2008 | Bonner | A01K 1/0035 | 119/417 |
| 7,467,602 B2 * | 12/2008 | Yoshida | A01K 1/031 | 119/419 |
| 8,297,230 B2 * | 10/2012 | Ferrer | A01K 1/035 | 119/165 |
| 8,985,058 B2 * | 3/2015 | Cantwell | A01K 1/03 | 119/474 |
| 10,842,125 B1 * | 11/2020 | Christian | A01K 1/0058 | |
| 2002/0023594 A1 * | 2/2002 | Greene, Jr. | A01K 1/0236 | 119/496 |
| 2005/0284405 A1 * | 12/2005 | Pomakoy-Poole | A01K 1/0245 | 119/497 |
| 2007/0056524 A1 * | 3/2007 | Barca | A01K 1/0245 | 119/496 |
| 2009/0050069 A1 * | 2/2009 | Hurwitz | A01K 1/0245 | 119/497 |
| 2010/0192870 A1 * | 8/2010 | Wood | A01K 1/0245 | 119/496 |
| 2011/0005466 A1 * | 1/2011 | Furth | A01K 1/0245 | 119/496 |
| 2011/0126775 A1 * | 6/2011 | Seltzer | A01K 1/033 | 119/496 |
| 2014/0352625 A1 * | 12/2014 | Reginhard | A01K 1/0245 | 119/496 |
| 2016/0057968 A1 * | 3/2016 | Chandler | A01K 1/0272 | 119/497 |
| 2016/0095290 A1 * | 4/2016 | Reginhard | A01K 1/0272 | 119/496 |

OTHER PUBLICATIONS

Frisco; "Frisco Training & Potty Pads, 22-in × 23-in" Chewy.com; Accessed Apr. 30, 2018 (10 pages).

AmazonBasics "AmazonBasics Pet Training and Puppy Pads" Amazon.com; Accessed Apr. 30, 2018 (11 pages).

"Pack of 3—Vet Care Reusable/Washeable Large 8 Layer Dog/Puppy Housebreaking Training Travel Pee Pads" CutestDogsOnline.com; Accessed Apr. 30, 2018 (6 pages).

U.B. Spike "U.B. Spike's Washable Pee Pad: Reusable, Eco-friendly, Puppy Potty Training Pads, or Use for Sick or Elderly, Incontinent Dogs. Great for Crates, Crate Training and Perfect for Traveling with Your Dog. Best Pet Pee Pads Designed with an Outer Layer of Quality Flannel, an Absorbent Inner Layer and a Water-proof Bottom Layer" Amazon.com; Accessed Apr. 30, 2018 (4 pages).

Foster Smith "Delux Orthopedic Textured w/ SecntLock" DrsFosterSmith.com www.disrostersmith.com/product/prod_display.cfm?c=3307+1+25+338998pcatid=33899; Accessed Oct. 19, 2017.

Foster Smith "About Drs. Foster & Smith Dog Beds" DrsFosterSmith.com; Accessed Apr. 30, 2018 (3 pages).

Petmate "Petmare Booda Clean Step Litter Box" PetSmart.com; Accessed Apr. 30, 2018 (13 pages).

* cited by examiner

VEHICLE, VENTILATION SYSTEM, AND METHOD FOR TRANSPORTING PETS

FIELD OF EMBODIMENTS OF THE DISCLOSURE

Embodiments of the present disclosure generally relate to vehicles, ventilation systems, and methods for transporting animal pets onboard vehicles, such as commercial aircraft.

BACKGROUND OF THE DISCLOSURE

Many passengers on commercial aircraft, desire traveling with their pets, such as dogs, cats, rabbits, hamsters, and birds. In order to transport a pet on a commercial vehicle, a passenger typically has at most two options.

The first option is to transport the pet in a crate within a cargo area separate from the passenger cabin. Because the pet is in a cargo area with luggage, the cargo area may have uncomfortable conditions including dark lighting, hot and/or cold temperatures, loud noises, and the like, which may cause anxiety in certain pets. In addition to being uncomfortable, the fear and confusion of being in a different place than the pet's owner may cause the pet to suffer anxiety. Furthermore, the pet's owner in the passenger cabin may worry about the condition of the pet in the cargo area during the trip, elevating the anxiety of the owner and reducing the owner's enjoyment of the trip.

The second option that is only available for certain pets that meet specific restrictions (e.g., types of pet, sizes, behaviors, etc.) is to stow the pet within a bag under a passenger seat in the passenger cabin for the duration of the trip. Assuming that a passenger's pet meets the strict criteria, stowing the pet in the passenger cabin near the owner's feet may cause the owner to worry about the pet disturbing other passengers, such as by making too much noise or by triggering allergy-related symptoms in other passengers. Also, although the ambient conditions within the passenger cabin may be more comfortable than in the cargo area, the pet may still be uncomfortable due to being confined in a small bag or crate for several hours. Moreover, by stowing the pet in a bag underneath a seat, the available legroom for the passenger is reduced.

Accordingly, when traveling on a commercial vehicle with a pet, the pet may experience mild to significant discomfort and/or anxiety, and the owner may also experience discomfort and/or anxiety, regardless of the pet being stowed in the cargo area or in the passenger cabin underneath a seat.

SUMMARY OF THE DISCLOSURE

Certain embodiments of the present disclosure provide a vehicle that includes a passenger cabin, a monument, a pet travel system, and a ventilation system. The pet travel system includes at least a portion of the monument and at least one pet storage module configured to be received in the portion of the monument. The ventilation system includes an inlet port, an exhaust port, and an exhaust duct. The inlet port is defined in the at least one pet storage module. The inlet port is in flow communication with an air source outside of the pet travel system. The exhaust port is defined in the at least one pet storage module. The exhaust duct is in flow communication with the exhaust port. The pressure within the exhaust duct is lower than the pressure of the air source to cause air to flow from the air source through the at least one pet storage module from the inlet port to the exhaust port.

Certain embodiments of the present disclosure provide a ventilation system for use with a vehicle having a pet travel system. An air source is outside of the pet travel system. The ventilation system includes an inlet port, an exhaust port, and an exhaust duct. The inlet port is defined within the pet travel system and in flow communication with the air source. The exhaust port is defined within the pet travel system. The exhaust duct is outside of the pet travel system. The exhaust duct is in flow communication with the exhaust port of the pet travel system. The pressure within the exhaust duct is lower than the pressure of the air source to cause air to flow from the air source through the pet travel system from the inlet port to the exhaust port.

Certain embodiments of the present disclosure provide a method for traveling with a pet on a vehicle having a monument within a passenger cabin. The method includes inserting a pet storage module in a portion of the monument. The method includes providing flow communication between the passenger cabin and a cavity of the pet storage module via an inlet port defined in the pet storage module. The method also includes coupling an exhaust port of the pet storage module in flow communication with an exhaust duct of the vehicle. The pressure within the exhaust duct is lower than the pressure in the passenger cabin to cause air to flow from the passenger cabin through the pet storage module from the inlet port to the exhaust port.

DETAILED DESCRIPTION OF THE DISCLOSURE

Figure 1:
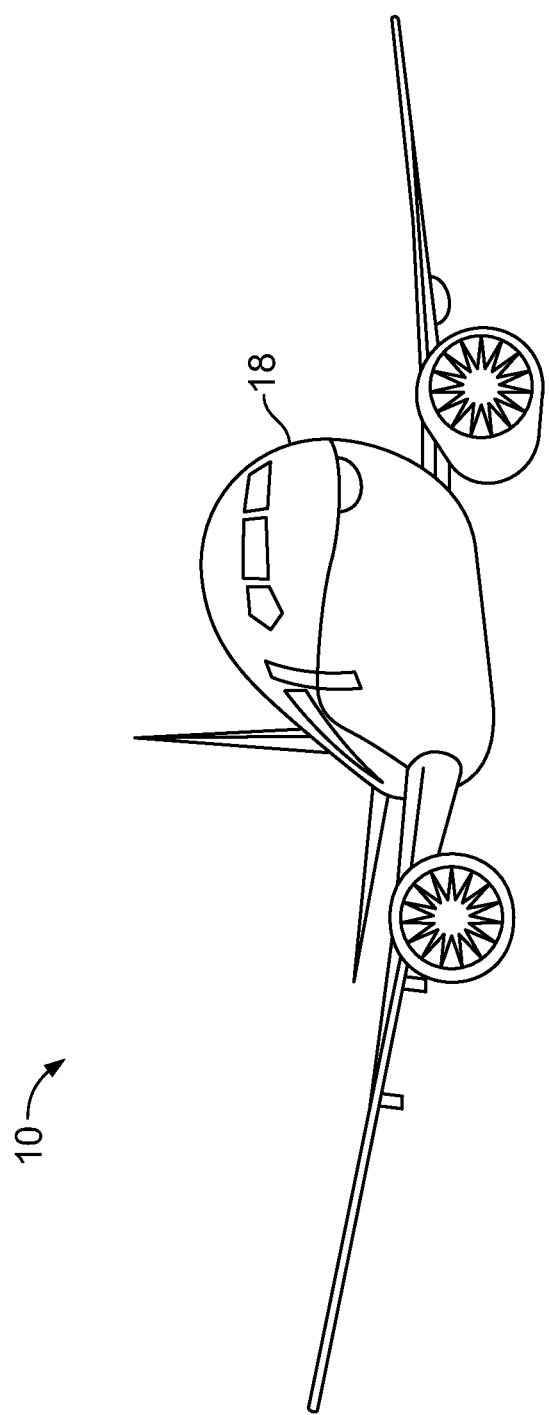
FIG. 1 illustrates a front perspective view of an aircraft according to an embodiment of the present disclosure.

This disclosure provides various embodiments of vehicles, ventilation systems, and methods for transporting pets onboard a vehicle, such as a commercial aircraft, that can increase pet comfort and reduce owner passenger anxiety. More specifically, pets are stored in a passenger cabin of the vehicle without stowing the pets underneath passenger seats. The embodiments of the vehicles, ventilation systems, and methods described herein can provide amenities and services to pets traveling within a passenger cabin of a vehicle to increase the comfort of the pets during the trip without disturbing the passengers.

Certain embodiments of the present disclosure provide a pet travel system that includes a pet storage module that is configured to receive and contain a live pet animal, such as a dog, cat, bird, rabbit, hamster, or the like. The pet storage module is configured to be loaded into a monument on a vehicle, such that the pet travels within the pet storage module in the monument during a trip of the vehicle. The monument may be a closet, a rest bunk, or the like. The monument defines a compartment that accommodates the pet storage module. The monument is located in a passenger cabin of the vehicle. Human passengers in the vehicle are located within the passenger cabin. As opposed to being in a cargo area of the vehicle below the passenger cabin, the pet storage module may be near at least some of the passengers, although one or more walls or other objects may separate the pet storage module from the passengers.

The pet storage module may have several amenities for the pet designed to increase the comfort level of the pet. For example, the pet storage module may include a padded cushion on which the pet can lay, and optionally may also include padded side walls. The pet storage module may include a water dispenser, a bowl for water and/or food, dimmable lighting, and/or the like. The pet storage modules may be available in multiple different sizes to provide a desired amount of space for a given pet to comfortably lay, stand, stretch, and (optionally) walk within the pet storage module.

Furthermore, in one or more embodiments disclosed herein, the monument that holds the pet storage module may be within a well-lit, temperature-controlled environment. For example, a pet within the pet storage module may be exposed to the same or similar temperature, lighting, and/or ventilation conditions as the passengers. Therefore, as compared to storing a pet within a cargo bay of a vehicle (which may be dark, cold, and/or stagnant), storing pets within the pet storage module in the monument may be more comfortable and less stressful for the pets.

Another difference between storing pets within the pet storage module according to the embodiments disclosed herein and storing pets within the cargo bay is that a pet within the pet storage module in the monument may be more accessible to the pet owner during the trip than a pet stored within the cargo bay. The owner of a specific pet may be allowed at certain times during the trip to walk to the monument to visit the pet. Additionally, or alternatively, the owner may be able to monitor the pet remotely without leaving the owner's seat through the use of an imaging device, such as a camera, that is mounted in an orientation to capture image data of the pet within the pet storage module in the monument.

In one or more embodiments of the present disclosure, the vehicle includes a ventilation system that is configured to direct air flow through the pet storage module of the pet travel system. In addition to providing ventilation for the pet, the air flow may be configured to entrain pet hair and/or particulates (e.g., dander, dust mites, etc.) to remove such pet hair and/or particulates from the pet storage module. In at least one embodiment, the pet storage module includes a filter that is configured to entrap the pet hair and/or particulates entrained within the air. Optionally, the air may be discharged from the pet storage module through an exhaust port into an exhaust duct of the ventilation system that is closed off from the passenger cabin. Therefore, even if the pet storage module lacks the filter, the pet hair and/or particulates entrained in the air are swept into the exhaust duct, away from the passenger cabin. The ventilation system is configured to prevent, or at least reduce, the transmission of pet hair, particulates, odor, and the like, from the pet storage module into the passenger cabin, which may disturb and/or irritate some of the passengers. Dander and other particulates emitted by pets can cause allergic reactions in some susceptible passengers. By preventing the release of pet hair and particulates (including dander) from the pet storage module in the monument into the passenger cabin, the ventilation system may allow pet owners to transport their pets within or near the passenger cabin of the vehicle without disturbing passengers that are allergic or sensitive to pet odors.

The ventilation system may also be configured to reduce the load on filters within an environmental control system of the vehicle that is used for heating, ventilation, and air-conditioning within the vehicle. For example, known commercial passenger vehicles may limit a number of pets admitted into a passenger cabin because the pet hair and/or particulates associated with the pets may overly tax the filters in the environmental control system. The ventilation system according to the embodiments described herein avoids this issue by entrapping pet hair and particulates in separate filters disposed in the pet storage modules or the monument, and/or exhausting the air that entrains the pet hair and particulates from the vehicle. As a result, the pet hair and particulates from the pet travel system do not impinge upon the filters of the environmental control system.

Certain embodiments of the present disclosure provide pet owners with an option for pet travel on vehicles that is more comfortable for the pet than stowing the pet within the cargo area of the vehicle and is less disturbing to other passengers than stowing the pet directly under the owner's seat. The pet travel systems and methods disclosed herein do not interfere with passenger-related operations in the passenger cabin because the pet storage module occupies space within a portion of a pre-existing monument, such as a closet or a rest bunk. As such, the pet travel system makes efficient use of available space within the vehicle. The embodiments of the present disclosure also may provide commercial carriers (e.g., airlines, rail companies, etc.) with an additional revenue source by renting the space within the monuments for pet accommodations.

FIG. 1 illustrates a front perspective view of an aircraft 10 according to an embodiment of the present disclosure. The aircraft 10 includes a main body 18. The main body 18 of the aircraft 10 defines at least a passenger cabin. As used herein, the main body 18 of the aircraft 10 can be referred to as a fuselage 18.

Alternatively, instead of an aircraft, embodiments of the present disclosure may be used with various other vehicles, such as automobiles, buses, rail vehicles (e.g., locomotives and train cars), seacraft, spacecraft, vehicles that move within reduced-pressure tubes, and the like.

Figure 2:
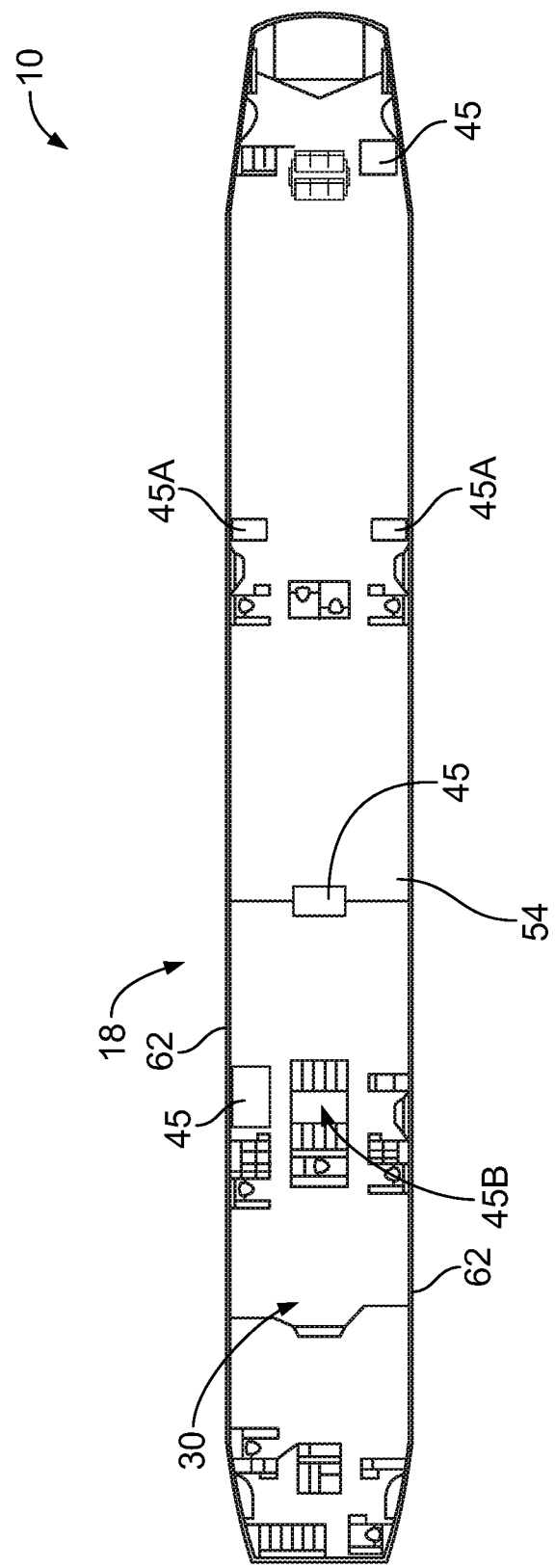
FIG. 2 illustrates a top plan view of a passenger cabin of the aircraft shown in FIG. 1, according to an embodiment of the present disclosure.

FIG. 2 illustrates a top plan view of a passenger cabin 30 of the aircraft 10 according to an embodiment of the present disclosure. The passenger cabin 30 is within the fuselage 18. For example, one or more fuselage wall members 62 may define the passenger cabin 30. The passenger cabin 30 may include multiple sections or zones.

The passenger cabin 30 includes several monuments 45 located within the same or different sections of the passenger cabin 30. At least some of the monuments 45 may be configurable for selective storage of a pet storage module 202 (shown in FIGS. 4-8, 11, and 12) to define a pet travel system 200 (shown in FIGS. 4, 7, 11, and 12) according to embodiments of the present disclosure described herein. Although five monuments 45 are shown in FIG. 2, the aircraft 10 may have different numbers and/or locations of the monuments 45 in other embodiments. The monuments 45 may be closets 45A, rest bunks 45B, or the like. For example, rest bunks 45B are elongated compartments configured to accommodate an adult person lying down to enable a person on the crew to rest during a trip of the aircraft 10. Optionally, the rest bunks 45B may be configured to receive the pet storage modules 202 therein when not occupied by resting people, such as during daytime trips and short distance trips. The passenger cabin 30 includes passenger seats 122 (shown in FIG. 3). Optionally, some of the passenger seats 122 may be located near one or more of the monuments 45.

Figure 3:
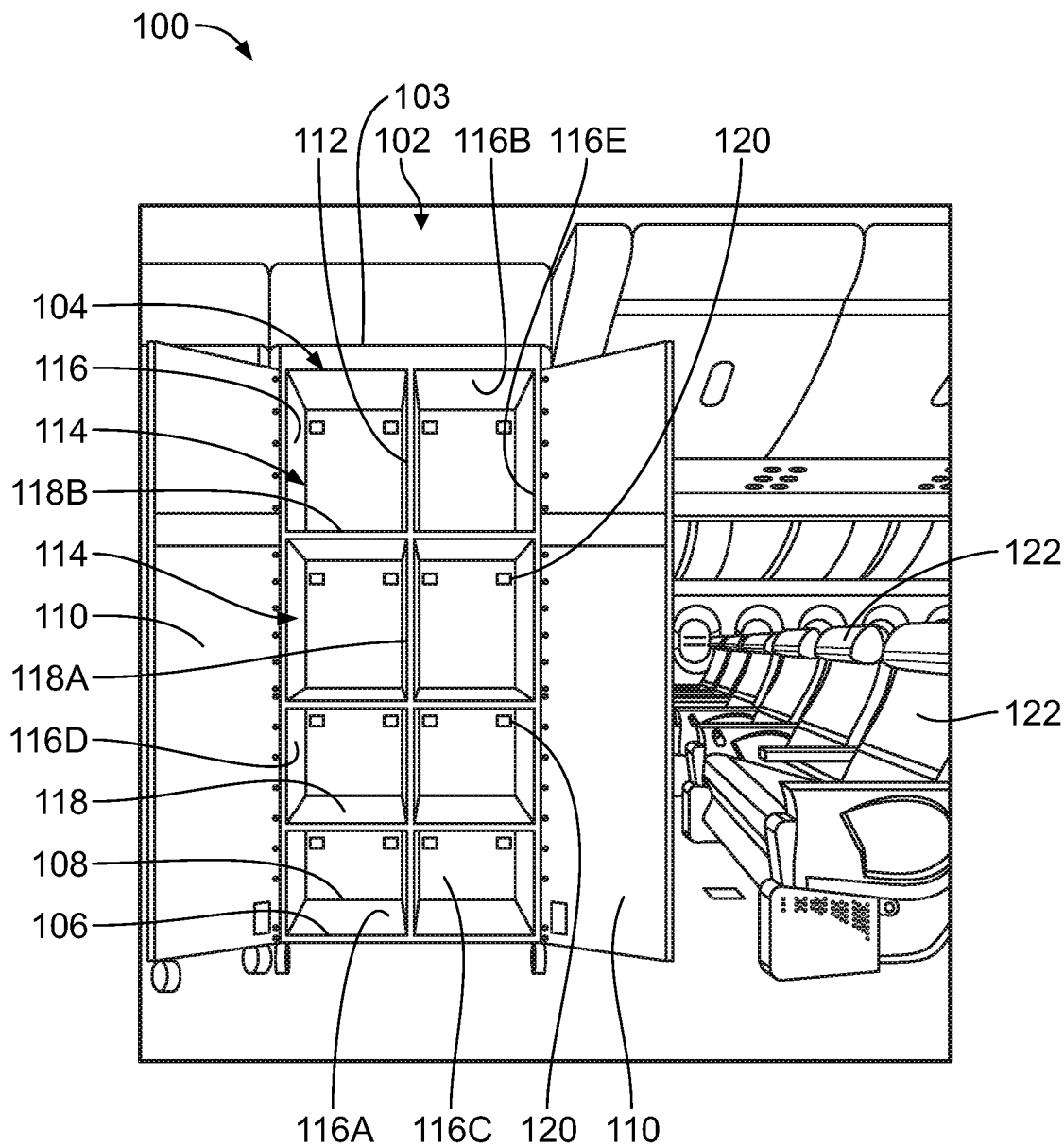
FIG. 3 illustrates a section of a passenger cabin of a vehicle, according to an embodiment of the present disclosure.

FIG. 3 illustrates a section of a passenger cabin 102 of a vehicle 100 according to an embodiment. The vehicle 100 may be an aircraft (such as the aircraft 10 shown in FIG. 1), a rail vehicle, a marine vessel, or the like. The passenger cabin 102 includes a monument 103. The monument 103 is, or includes, a closet 104. For example, the closet 104 may represent the entire monument 103 or may be a portion of the monument 103. When the vehicle 100 is the aircraft 10, the passenger cabin 102 is the passenger cabin 30, and the closet 104 of the monument 103 is one of the closets 45A of the monuments 45. The closet 104 extends a depth between a front end 106 and an opposite rear end 108. The closet 104 has two doors 110 that are connected via hinges at the front end 106. The doors 110 are shown in open positions such that an interior of the closet 104 is accessible to a passenger or an attendant of the vehicle 100.

The closet 104 includes multiple closet walls 112 that define at least one compartment 114. The closet walls 112 in the illustrated embodiment include fixed frame walls 116 and removable partitions 118. The frame walls 116 define a perimeter of the closet 104. The frame walls 116 include a bottom wall 116A, a top wall 116B, a back wall 116C, a first side wall 116D, and a second side wall 116E opposite the first side wall 116D. Each of the frame walls 116 extends from the front end 106 to the rear end 108 of the closet 104. The compartments 114 are open at the front end 106. The doors 110 are connected to the first and second side walls 116D, 116E. The frame walls 116 structurally support the closet 104, and are generally not removable without disassembling the closet 104.

The partitions 118 are configured to be selectively movable and/or removable relative to the frame walls 116. In the illustrated embodiment, the partitions 118 include vertical column walls 118A and horizontal shelves 118B. In at least one other embodiment, the partitions 118 may include a different number and/or arrangement of the vertical column walls 118A and/or the horizontal shelves 118B. The compartments 114 are defined by the partitions 118 and the frame walls 116. There are eight discrete compartments 114 in the illustrated configuration, but the partitions 118 may be arranged to define more or less than eight discrete compartments 114 in other embodiments. The partitions 118 can be moved and/or removed from the closet 104 to vary the number of compartments 114 within the closet 104, as well as the sizes and locations of the different compartments 114. The compartments 114 can be used to hold various passenger-related items (e.g., bags, luggage, coats, hats, car seats, strollers, etc.), various attendant-related items, (e.g., personal items of attendants on the aircraft 10), aircraft supplies, and/or the pet storage modules 202 (shown in FIG. 4). When the doors 110 are closed, the items within the interior of the closet 104 are obstructed from view behind the doors 110.

In at least one embodiment, the closet 104 is configurable for use as a pet travel system 200 (shown in FIG. 4) within the passenger cabin 102. The closet 104 may be located near passenger seats 122. Passengers may be able to view the pets within pet storage modules 202 of the pet travel system 200 from the passenger seats 122 and/or by walking up to the closet 104.

In at least one embodiment, the closet 104 includes multiple latch members 120 mounted within the closet 104. The latch members 120 are mounted to the back wall 116C of the closet 104. Optionally, instead of or in addition to mounting the latch members 120 to the back wall 116C, at least some of the latch members 120 may be mounted to other frame walls 116 and/or the partitions 118 of the closet 104. The latch members 120 are configured to releasably connect to complementary latch members 208 (shown in FIG. 5) on the pet storage modules 202 to secure the pet storage modules 202 within the closet 104 during a trip. The latch members 120 may be arranged in an array along the back wall 116C, such as in rows and columns, which allows for loading the pet storage modules 202 in various compartments 114 within the closet 104.

Figure 4:
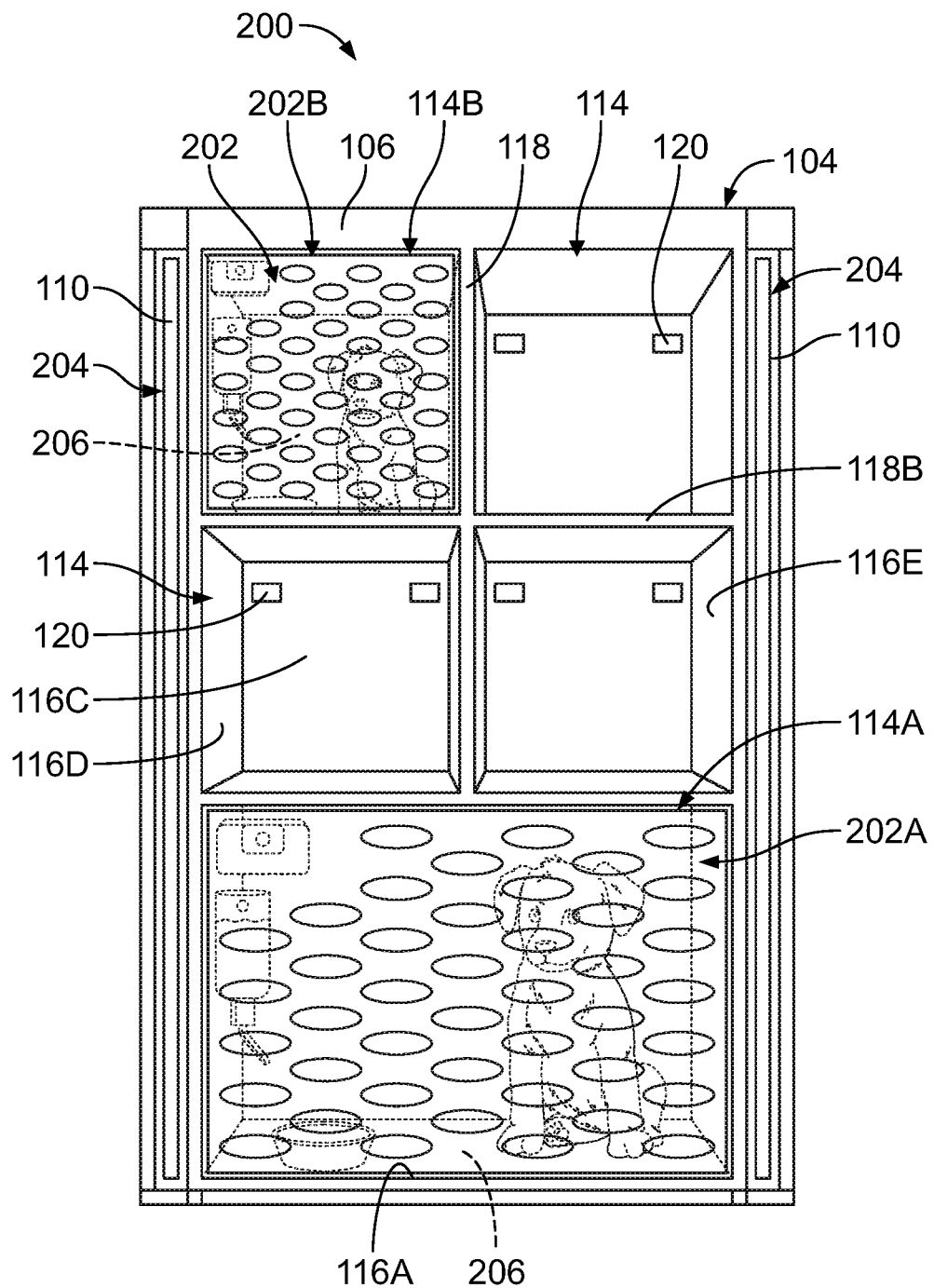
FIG. 4 illustrates a pet travel system of the vehicle, according to an embodiment of the present disclosure.

FIG. 4 illustrates a pet travel system 200 of the vehicle 100 (shown in FIG. 3) according to an embodiment of the present disclosure that includes the closet 104 of the monument 103 (FIG. 3) and multiple pet storage modules 202. The pet travel system 200 is designed to safely and comfortably transport live animals within the passenger cabin 102 (FIG. 3) during a trip of the vehicle 100. When the vehicle 100 is the aircraft 10 (shown in FIG. 1), the pet travel system 200 includes at least a portion of a monument 45 (FIG. 2) and one or more of the pet storage modules 202.

The pet travel system 200 in the illustrated embodiment includes the closet 104 and two pet storage modules 202 held within corresponding compartments 114 of the closet 104. One of the pet storage modules 202A is larger than the other pet storage module 202B. The pet within the larger pet storage module 202A may be larger than the pet within the smaller pet storage module 202B, thus requiring more space. Optionally, the owner of the pet within the larger pet storage module 202A may have chosen the larger-size in order to provide the pet with more space for moving within the pet storage module 202A during the trip.

As compared to the configuration of the closet 104 in FIG. 3, some of the partitions 118 have been removed to accommodate the larger pet storage module 202A. The closet 104 in the illustrated configuration defines five compartments 114 as opposed to the eight compartments 114 shown in FIG. 3. The sizes of the compartments 114 may be based on the sizes of the pet storage modules 202 that are received in the compartments 114. For example, the larger pet storage module 202A is received in a first compartment 114A that is larger than a second compartment 114B that receives the smaller pet storage module 202B. Although two pet storage modules 202 are shown in FIG. 4, it is recognized that the closet 104 may be able to accommodate more than two pet storage modules 202, depending on the available space and the sizes of the pet storage modules 202. The unoccupied compartments 114 of the closet 104 can be used for storing one or more additional pet storage modules 202 and/or pet-related items (e.g., pet carrying bags, pet supplies). The unoccupied compartments 114 can also be used for storing other, non-pet-related items, such as passenger luggage, passenger or crew member personal items, vehicle supplies, or the like.

In at least one embodiment, the doors 110 of the closet 104 are retractable and/or removable in order to allow the passengers to view the pet storage modules 202. In the illustrated embodiment, the doors 110 are retractable and are inserted into slots 204 along the outside of the first and second side walls 116D, 116E. Alternatively, the doors 110 may be foldable (e.g., like an accordion) or entirely removable from the closet 104. By retracting the doors 110, the pet storage modules 202 are visible at the front end 106 of the closet 104. The pet storage modules 202 may each have a see-through door 206 that aligns generally with the front end 106 of the closet 104. The pets within the pet storage modules 202 may be able to look through the doors 206 and view the passenger cabin 102 (FIG. 3) outside of the closet 104. Likewise, passengers in front of the closet 104 may be able to look through the doors 206 to view the pets within the pet storage modules 202. The see-through door 206 may be a cage, mesh, screen, or the like. In at least one embodiment, the see-through door 206 may include at least a solid, transparent portion, such as a glass or plexiglass portion. Being able to see people outside of the closet 104 may reduce stress and anxiety experienced by the pets, and may provide peace of mind to the owners of the pets who are able to view the pets within the pet storage modules 202.

The pet storage modules 202 may be secured within the corresponding compartments 114 to prevent the pet storage modules 202 from moving relative to the closet 104 during the trip. For example, the pet storage modules 202 may each include at least one latch member 208 (shown in FIG. 5) mounted to an exterior of the pet storage module 202. The latch members 208 are complementary to the latch members 120 mounted within the closet 104. When a given pet storage module 202 is loaded into a corresponding compartment 114, the one or more latch members 208 of the pet storage module 202 are configured to releasably connect to corresponding latch members 120 within the compartment 114. The connection between the latch members 208, 120 secures the pet storage module 202 within the closet 104, preventing the pet storage module 202 from sliding or falling out of the closet 104 through the opening at the front end 106 (since the doors 110 are retracted). In the illustrated embodiment, the pet storage modules 202 are supported by the shelves 118B and/or the bottom wall 116A of the closet 104. Optionally, the latch members 208 may also support at least some of the weight of the pet storage modules 202, such that the pet storage modules 202 are at least partially suspended by the latching mechanism that is defined by the latch members 208, 120. In at least one other embodiment, the pet storage modules 202 may be at least partially supported by guide tracks mounted within the compartments 114.

Figure 5:
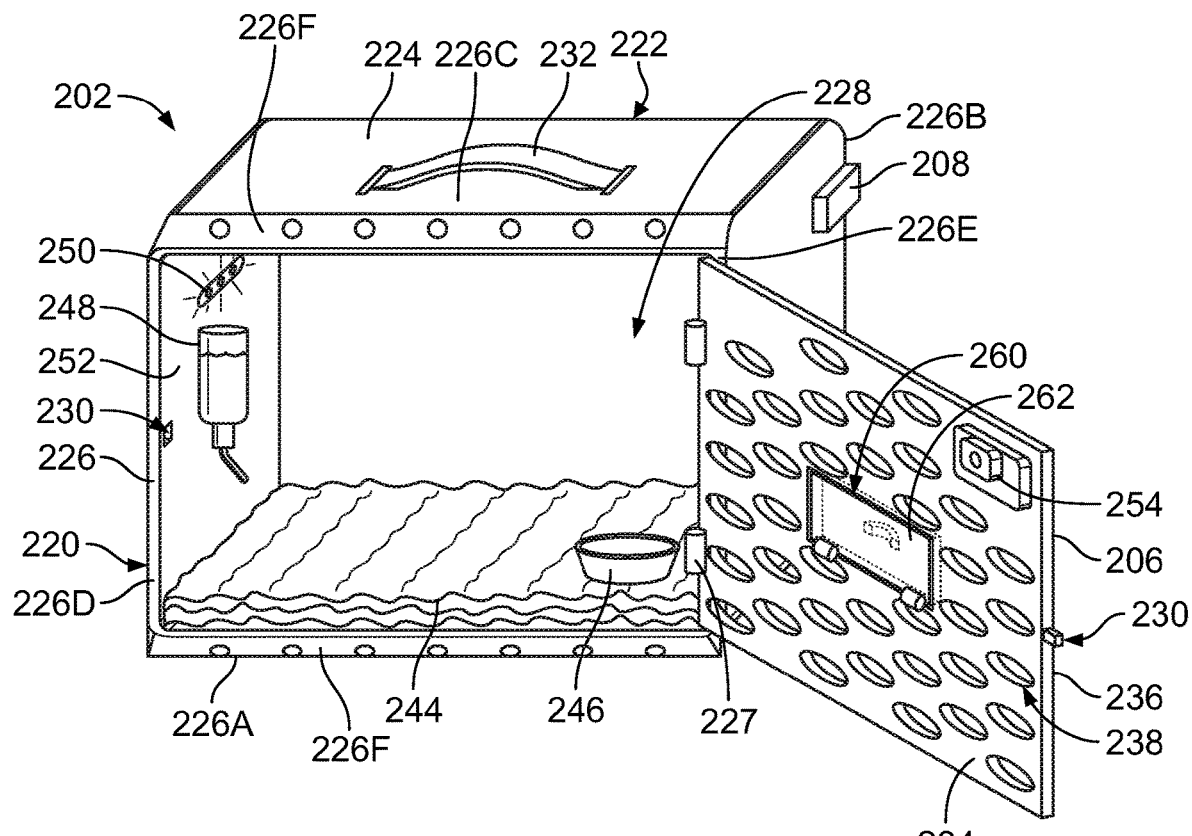
FIG. 5 is a perspective view of a pet storage module of the pet travel system, according to an embodiment of the present disclosure.

FIG. 5 is a perspective view of a pet storage module 202 according to an embodiment of the present disclosure showing the door 206 of the pet storage module 202 in an open position. In at least one embodiment, the pet storage modules 202 of the pet travel system 200 shown in FIG. 4 may have different sizes, but may also share many features and characteristics in common. Therefore, the description of the pet storage module 202 in the illustrated embodiment may be applicable to pet storage modules 202 of different sizes.

The pet storage module 202 has a front end 220 and an opposite rear end 222. The pet storage module 202 includes a housing 224 that includes multiple module walls 226. The module walls 226 of the housing 224 define a cavity 228 that receives at least one pet therein. The module walls 226 include a bottom wall 226A on which the pet stands or lays, a rear wall 226B opposite the door 206, and at least one side wall. In the illustrated embodiment, the housing 224 has a rectangular shape and includes a top wall 226C, a first side wall 226D, and a second side wall 226E. In the illustrated embodiment, the housing 224 also includes a front wall 226F at the front end 220. The front wall 226F has an upper portion above the door 206 and a lower portion below the door 206. In at least one other embodiment, the housing 224 does not have the front wall 226F, such that the door 206 defines a front wall of the pet storage module 202 when closed. In other embodiments, the housing 224 may have more or less than the four walls 226A, 226C, 226D, 226E extending between the rear wall 226B and the front wall 226F and/or the door 206, such that the housing 224 may have a triangular shape, a hexagonal shape, a partially cylindrical shape, or the like.

The housing 224 is connected to the door 206 at the front end 220 via hinges 227. The housing 224 is open at the front end 220. When the door 206 is in an open position relative to the housing 224, pets can be loaded and unloaded relative to the cavity 228. When the door 206 is in a closed position relative to the housing 224, the door 206 extends across the opening of the housing 224 to enclose the cavity 228. The closed door 206 prevents pets within the cavity 228 from escaping from the pet storage module 202. The door 206 may be releasably secured in the closed position using a locking mechanism 230. The door 206 extends a length from a fixed end that is secured to the housing 224 (via the hinges 227) to a distal, locking end that includes a portion of the locking mechanism 230.

The pet storage module 202 includes one or more latch members 208 on an exterior surface of the housing 224. In FIG. 5, only one latch member 208 is visible, and is mounted to the second side wall 226E. Although not shown, the pet storage module 202 may include at least another latch member 208 mounted to the first side wall 226D. The one or more latch members 208 are located at or proximate to the rear end 222 of the pet storage module 202. The latch members 208 may be configured to engage corresponding latch members 120 on the back wall 116C of the closet 104, as shown in FIG. 4. In at least one other embodiment, the latch members 208 may be located more proximate to the front end 220. For example, the complementary latch members 120 in the closet 104 may be mounted on the closet walls 112 more proximate to the front end 106 of the closet 104.

In at least one embodiment, the housing 224 is composed of a metal material, a composite material, and/or a polymer material, such as a plastic. For example, the module walls 226 may be lattices of criss-crossing metal bars, or may be panels of plastic or metal. The module walls 226 may define openings for ventilation. The module walls 226 may be at least partially covered by a sound-absorbing padding for muffling sounds emitted from the pet within the cavity 228. The housing 224 optionally includes at least one handle 232 that allows a person to pick up the pet storage module 202 for loading and unloading the pet storage module 202 relative to the closet 104. Optionally, the pet storage module 202 may include additional handles for multiple persons to grasp. The pet storage modules 202 also may include wheels (not shown) located under the bottom wall 226A that allow the pet storage module 202 to roll.

The door 206 of the pet storage module 202 may be see-through, such as transparent or at least translucent. The door 206 may be composed of a glass or a polymer. In at least one other embodiment, the door 206 may be a cage, screen, or mesh. The door 206 includes an inner surface 234 and an opposite outer surface 236. In at least one embodiment, the door 206 includes air holes 238 that extend through the door 206 between the inner and outer surfaces 234, 236 to provide ventilation for the pet within the cavity 228. The air holes 238 may have various sizes, with dimensions (e.g., diameters) ranging from centimeters down to micrometers. For example, in the illustrated embodiment, the air holes 238 are visible and have dimensions in the millimeter and/or centimeter range, such as between about 2 mm and about 20 mm (i.e., 2 cm). However, in at least one other embodiment, the door 206 may be composed of a porous material that includes very small air holes.

The pet storage module 202 may also include various other amenities, such as a cushion 244 within the cavity 228 located on the bottom wall 226A, a bowl 246 for water and/or food, a water dispenser 248, lights 250, and/or the like. The water dispenser 248 is mounted to an inner surface 252 of the first side wall 226D, but may be mounted to the door 206 or any suitable module wall 226 in at least one other embodiment. The inner surface 252 faces and at least partially defines the cavity 228. The bowl 246 is shown placed on top of the cushion 244. The pet storage module 202 in at least one other embodiment may include a mount attached to one of the walls 226 for suspending the bowl 246 above the cushion 244, similar to the mounted water dispenser 248. The lights 250 may include one or more LED light strips attached to the inner surface 252 of one or more of the module walls 226. The lights 250 may be powered via battery power, solar power, or the electrical system on the vehicle 100 (FIG. 3) via a wired connection. The lights 250 may be dimmable. The pet storage module 202 optionally also includes a camera 254 positioned to acquire image data (e.g., still images and/or video) of the pet within the cavity 228.

In addition, the door 206 optionally may include a window 260 with a panel 262 within the window. The panel 262 may be movable, such that the panel 262 can be slid or pivoted along hinges relative to the door 206 between a closed position and an open position. The panel 262 in the closed position covers the window 260 and prevents physical access to the pet through the window 260. The panel 262 in the open position exposes the window 260 and allows physical access to the pet within the cavity 228 through the window 260 without opening the door 206. For example, the window 260 can be sized to allow a person's hand to fit through the window 260 for feeding or petting the pet through the door 206.

Although various different amenities are shown in FIG. 5, it is understood that the pet storage module 202 in other embodiments may not include all of the amenities shown and/or may include additional amenities that are not shown in FIG. 5.

Figure 6:
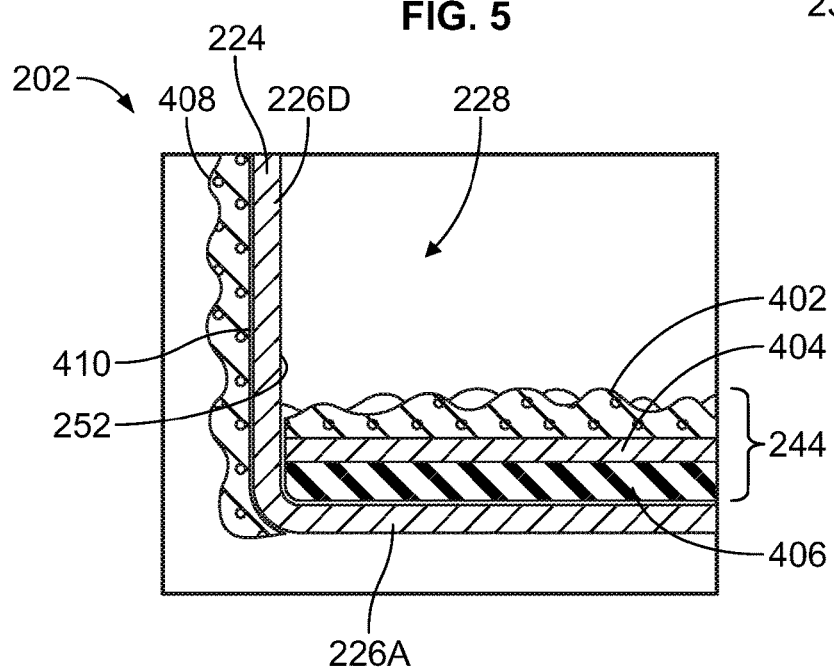
FIG. 6 is a cross-sectional view of a portion of the pet storage module according to an embodiment of the present disclosure.

FIG. 6 is a cross-sectional view of a portion of the pet storage module 202 according to an embodiment of the present disclosure. The portion of the pet storage module 202 shown is a corner area including lengths of the first side wall 226D and the bottom wall 226A. The cushion 244 is disposed on the bottom wall 226A within the cavity 228. The pet (or pets) within the cavity 228 may lie down and rest on the cushion 244 during the trip.

In at least one embodiment, the cushion 244 includes multiple different layers composed of different types of materials. For example, an upper layer 402 of the cushion 244 may be a sound-absorbing material, which may include a foam, rubber, or elastomeric material. The sound-absorbing material may be a soft, dry, porous, and comfortable material. The upper layer 402 may have a contoured surface design, such as an egg-crate or egg-carton pattern. An intermediate layer 404 of the cushion 244 may be a moisture-absorbing material, such as an absorbent fabric material. For example, the moisture-absorbing material may include one or more polymers configured to prevent the spread and leaking of moisture. A lower layer 406 of the cushion 244 may be a rubber or rubber-like pad or mat, and may resemble yoga mats. The lower layer 406 may be durable and protective. The intermediate layer 404 is between the lower layer 406 and the upper layer 402. Although three layers are shown, the cushion 244 may include additional layers or fewer layers in other embodiments. The upper, intermediate, and lower layers 402, 404, 406 may be bonded to each other via an adhesive.

A hook and loop fastener (not shown) may be mounted to a bottom side of the lower layer 406 to secure the cushion 244 in place within the cavity 228. For example, the hook and loop fastener on the cushion 244 may engage and grip a complementary material on the bottom wall 226A. In other embodiments, different types of fasteners may be used to removably secure the cushion 244 on the bottom wall 226A, such as snaps, hook-and-eyelet fasteners, and the like.

The cushion 244 may have a different arrangement of layers in other embodiments. For example, the upper layer 402 of the cushion 244 may be the moisture-absorbing layer or the rubber pad in at least one other embodiment. The multiple layers of the cushion 244 increase the comfort of the pet by providing a soft cushion that is able to absorb liquid spills. The cushion 244 may be disposable to allow for replacing worn-out or soiled cushions 244.

In at least one embodiment, the first side wall 226D of the pet storage module 202 is at least partially covered by a sound-absorbing padding 408. The sound-absorbing padding 408 may be the same or similar to the sound-absorbing material in the upper layer 402 of the cushion 244, described above. The sound-absorbing padding 408 is attached to an outer surface 410 of the first side wall 226D in the illustrated embodiment, but may be attached to the inner surface 252 in addition to, or instead of, the outer surface 410 in at least one other embodiment. The sound-absorbing padding 408 is configured to dampen or muffle the noises emitted from the pets, such as barks, to reduce the volume and/or amount of pet noises heard by the passengers seated in the passenger cabin. In at least one embodiment, the sound-absorbing padding 408 may cover other walls of the housing 224 as well, such as the top wall 226C, the second side wall 226E and the rear wall 226B (all shown in FIG. 5). Optionally, the sound-absorbing padding 408 may also include a moisture-absorbing layer.

Figure 7:
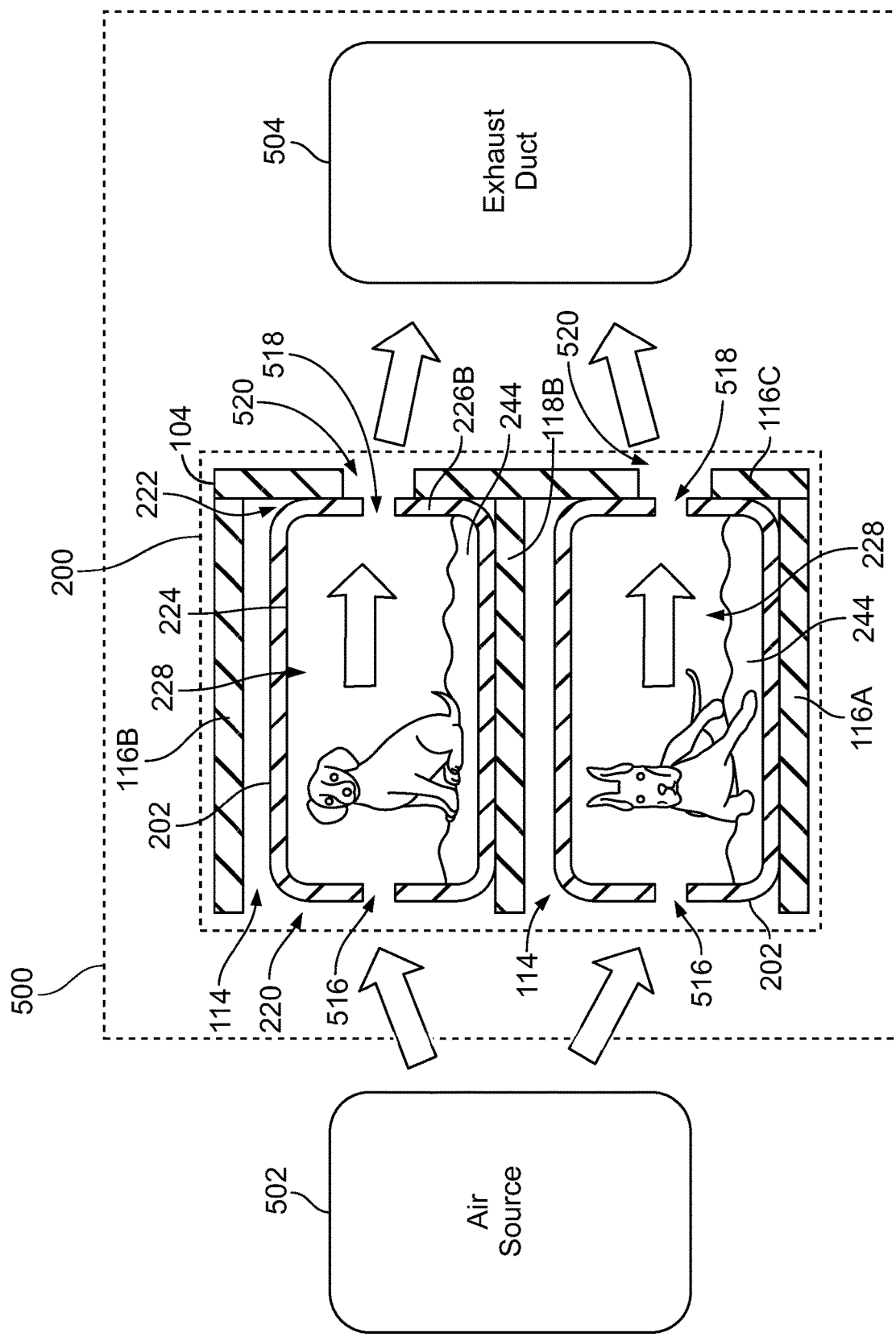
FIG. 7 is a schematic diagram of a ventilation system on the vehicle according to an embodiment of the present disclosure.

FIG. 7 is a schematic diagram of a ventilation system 500 on the vehicle 100 (FIG. 3) according to an embodiment of the present disclosure. The ventilation system 500 is configured to be used with the pet travel system 200 onboard the vehicle 100. As described herein, a portion of the pet travel system 200 may define part of the ventilation system 500. When the vehicle 100 is the aircraft 10, the ventilation system 500 is within the aircraft 10. The ventilation system 500 is configured to prevent or at least restrict pet hair, pet particulates (e.g., dander, dust mites, etc.), and odors emanating from the pets within the pet travel system 200 from disturbing the passengers in the passenger cabin 102 (FIG. 3) of the vehicle 100. The ventilation system 500 may also be used as a supplemental filtering system for the vehicle 100, to prevent the pet hair and particulates from the pet travel system 200 from building up on filters of an environmental control system 702 (shown in FIG. 11) of the vehicle 100.

In at least one embodiment, the ventilation system 500 includes at least an inlet port 516, an exhaust port 518, and an exhaust duct 504. The inlet port 516 and the exhaust port 518 may be portions of the pet travel system 200 in addition to portions of the ventilation system 500. For example, each of the pet storage modules 202 of the pet travel system 200 may include a respective inlet port 516 and a respective exhaust port 518, which allow for air flow through the cavities 228 of the pet storage modules 202.

The pet travel system 200 in the illustrated embodiment is shown in cross-section, and includes two pet storage modules 202 within two corresponding compartments 114 of a closet 104. The compartments 114 are stacked vertically. When the vehicle 100 that includes the closet 104 is the aircraft 10, the closet 104 may be one of the closets 45A. Although the closet 104 is shown, it is recognized that the pet travel system 200 is not limited to closets and may utilize a different type of monument within the passenger cabin 102 in other embodiments, such as rest bunks. The portions of the closet 104 illustrated in FIG. 7 include the bottom wall 116A, the top wall 116B, the back wall 116C, and a horizontal shelf 118B. The compartments 114 are open across from the back wall 116C. The pet storage modules 202 are oriented within the compartments 114 such that the rear ends 222 of the pet storage modules 202 are disposed against, or at least proximate to, the back wall 116C of the closet 104. The front ends 220 face away from the back wall 116C towards the passenger cabin 102 (FIG. 3).

In the illustrated embodiment, the pet storage modules 202 each house a corresponding dog. The dogs rest on the cushions 244 in the respective cavities 228. During the trip, the dogs may shed hair and other particulates, such as dander, which may accumulate within the respective cavities 228. The dogs also may emit odors. The ventilation system 500 is configured to provide air flow through the cavities 228 of the pet storage modules 202 to force the pet hair, particulates, and odor particles away from the passenger cabin 102. For example, the air flow may force the hair, particulates, and odor particles into a filter 600 (shown in FIG. 8).

An air source 502 outside of the pet travel system 200 (and the pet storage modules 202 thereof) is the source of air (or other gases) that flows through the pet travel system 200. For example, the inlet ports 516 of the pet storage modules 202 are disposed at the front ends 220 thereof in flow communication with the air source 502. In one embodiment, the air source 502 is the passenger cabin 102 (FIG. 3), such as air outside of the closet 104 within the passenger cabin 102 that is blown or drawn into the cavities 228 by one or more fans 750 (shown in FIG. 12). In at least one other embodiment, the air source 502 is an environmental control system 702 (shown in FIG. 11) of the vehicle 100. The environmental control system 702 conditions air and distributes the conditioned air through the vehicle 100. For example, a vent in ductwork may supply the conditioned air into the pet storage modules 202 through the inlet ports 516. In at least one other embodiment, the air source 502 may be compressed air from an air tank, or the like.

The exhaust ports 518 of the pet storage modules 202 are disposed at the rear ends 222 thereof. The exhaust ports 518 may be defined through the rear walls 226B of the housings 224. The exhaust ports 518 are in flow communication with the exhaust duct 504. In at least one embodiment, the air from the air source 502 flows through the pet travel system 200 from the inlet ports 516 to the exhaust ports 518, and enters the exhaust duct 504 upon discharge through the exhaust ports 518. The air flows through the cavity 228 of each of the pet storage modules 202 in a direction from the respective inlet port 516 towards the respective exhaust port 518. The air discharged from the respective exhaust port 518 enters the exhaust duct 504.

The back wall 116C of the closet 104 may define multiple openings 520 therethrough. Each of the openings 520 aligns with the exhaust port 518 of a corresponding one of the pet storage modules 202. The air that is discharged from the exhaust ports 518 may flow through the openings 520 of the back wall 116C before entering the exhaust duct 504. In at least one other embodiment, the exhaust duct 504 may be disposed on the same side of the back wall 116C as the pet storage modules 202, such that the back wall 116C does not include the openings 520. For example, the closet 104 may include a return air vent within at least one of the compartments 114 that represents the exhaust duct 504.

Although not shown in FIG. 7, the ventilation system 500 may include a filter 600 (shown in FIG. 8) to entrap pet hair, particulates, and/or odor particles that are entrained into the air flowing through the cavities 228. The filter 600 may be mounted within the cavity 228 of a respective pet storage module 202, to the back wall 116C of the closet 104, or within the exhaust duct 504.

In one or more embodiments, the exhaust duct 504 may be separate and closed off from the passenger cabin 102 (FIG. 3), such that the air within the exhaust duct 504 does not mix with air in the passenger cabin 102. In at least one embodiment, the exhaust duct 504 may be a return duct 716 (FIG. 11) for the environmental control system 702 of the vehicle 100. For example, at least some of the air that enters the return duct 716 may be re-conditioned within the environmental control system 702 and reused. The pet hair and particulates may be entrapped within the filter 600 such that the air that is recycled back to the environmental control system 702 may have negligible amounts of pet hair and particulates. In at least one other embodiment, the exhaust duct 504 may be configured to exhaust the air from the vehicle 100 into the surrounding environment of the vehicle 100. In such an embodiment, no filter may be used since the air with the entrained pet hair, particulates, and odor is discharged from the vehicle 100 into the surrounding environment.

In at least one other embodiment, the exhaust duct 504 may be open to the passenger cabin 102 (FIG. 3), such that the air that is discharged from the exhaust ports 518 into the exhaust duct 504 is introduced (or re-introduced) into the passenger cabin 102. Prior to entering the passenger cabin 102, the air flows through one or more filters (e.g., the filter 600 shown in FIG. 8) to entrap the entrained pet hair, particulates, and/or odors, such that the air that is introduced into the passenger cabin 102 is substantially free (e.g., at least 95% or at least 99% free) of pet hair, particulates and/or odors.

The air source 502 may be at a greater pressure than the pressure within the exhaust duct 504, such that a pressure differential is created between the air source 502 and the exhaust duct 504. The pet travel system 200 is disposed between the air source 502 and the exhaust duct 504, such that the pressure differential may extend across the pet travel system 200 (including the pet storage modules 202 and the closet 104). The pressure differential causes air to flow through the cavities 228 of the pet storage modules 202 in the illustrated direction from the inlet ports 516 to the respective exhaust ports 518. In at least one embodiment, the pressure differential may be established using pressure modulators, such as fans, to blow and/or draw air through the cavities 228.

Figure 8:
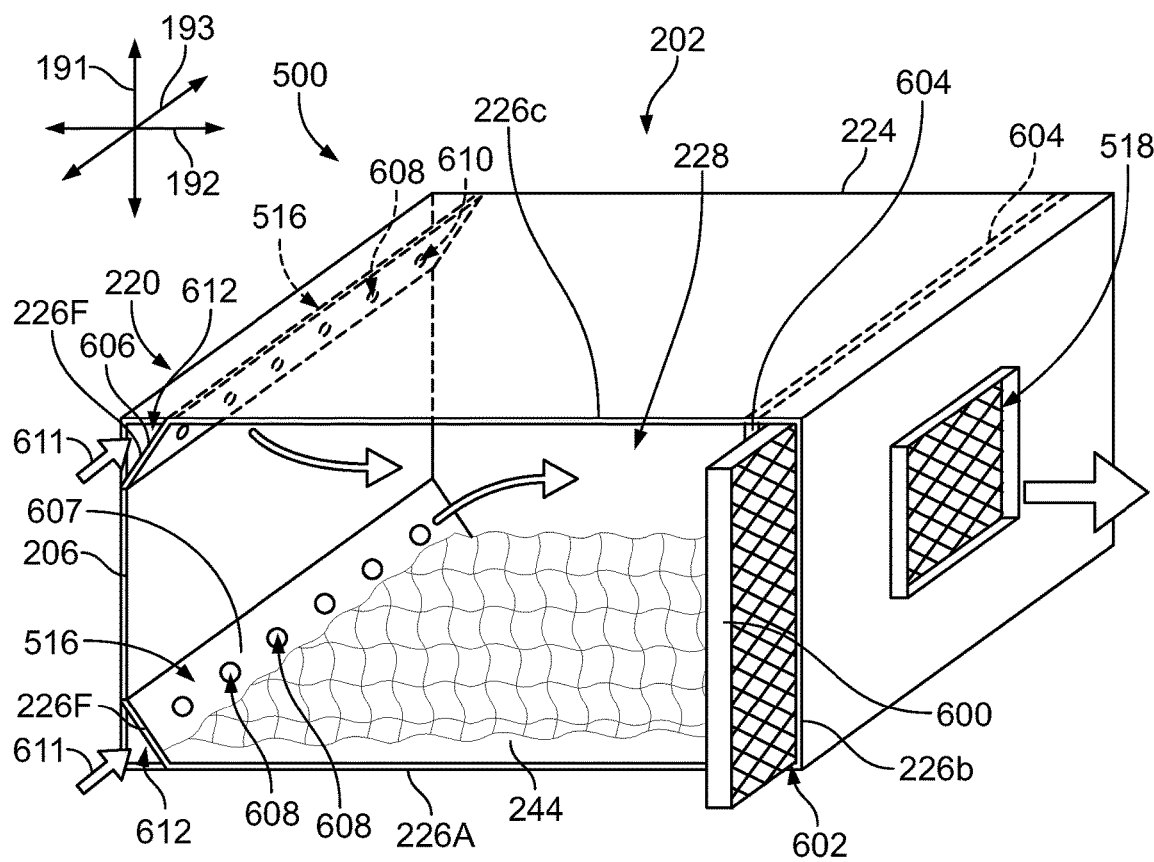
FIG. 8 is a rear perspective view of a pet storage module of the pet travel system according to an embodiment of the present disclosure.

FIGS. 8-12 depict various embodiments of the ventilation system 500 of the vehicle 100 that is used with the pet travel system 200. For example, FIG. 8 is a rear perspective view of a pet storage module 202 of the pet travel system 200 according to an embodiment of the present disclosure. FIG. 8 shows various components of the ventilation system 500, including the inlet port 516 of the pet storage module 202, the exhaust port 518 of the pet storage module 202, and the filter 600. The pet storage module 202 is shown in cross-section such that the second side wall 226E (shown in FIG. 5) is removed to be able to view the interior of the cavity 228. Some portions of the pet storage module 202 behind the top wall 226C are shown in phantom. The pet storage module 202 in FIG. 8 is oriented with respect to a vertical or elevation axis 191, a lateral or depth axis 192, and a longitudinal axis 193. The axes 191-193 are mutually perpendicular. Although the vertical axis 191 appears to extend generally parallel to gravity, it is understood that the axes 191-193 are not required to have any particular orientation with respect to gravity.

In the illustrated embodiment, the filter 600 is removably mounted to the housing 224 of the pet storage module 202. The housing 224 may define a slot 602 that is open at the second side wall 226E (not shown) to allow loading and unloading the filter 600 from outside of the cavity 228. The housing 224 may include a track 604 (partially shown in phantom in FIG. 8) along the top and bottom walls 226C, 226A of the housing 224. The track 604 extends into the cavity 228 and holds the filter 600 in a fixed position relative to the housing 224. The rear wall 226B of the housing 224 may define a rear portion of the track 604. In at least one other embodiment, the slot 602 and the track 604 may be defined entirely within the rear wall 226B of the housing 224 (instead of located adjacent to the rear wall 226B).

The filter 600 within the track 604 is exposed to air within the cavity 228. For example, the filter 600 may extend across the cavity 228 along a vertical and longitudinal plane. The filter 600 may be disposed adjacent to the exhaust port 518 of the pet storage module 202 that extends through the rear wall 226B. The filter 600 is between the exhaust port 518 and the inlet port 516. The filter 600 is upstream of the exhaust port 518 in the direction of flow of the air through the cavity 228 such that the air penetrates the filter 600 before being discharged from the cavity 228 through the exhaust port 518.

The filter 600 may be configured to entrap pet hair, pet particulates, and/or odor. The filter 600 may be a high efficiency particulate air (HEPA) filter, a charcoal filter, or a hybrid filter that includes both a HEPA filter layer and a charcoal filter layer. For example, the HEPA filter layer may be configured to entrap pet hair and particulates, and the charcoal filter layer may entrap odor particles. The filter 600 may be replaceable within the slot 602 of the housing 224.

As shown in FIG. 8, the cushion 244 (and any pet thereon) is upstream of the filter 600 along the direction of flow of the air through the cavity 228. For example, the cushion 244 is between the front end 220 of the pet storage module 202 and the filter 600. The air that enters the cavity 228 through the inlet port 516 may entrain pet hair, particulates, odors, and the like from the cavity 228, the cushion 244, and the pet prior to impinging upon the filter 600.

In the illustrated embodiment, the pet storage module 202 includes two inlet ports 516 that are disposed above and below the door 206, respectively, at the front end 220 of the pet storage module 202. Each of the inlet ports 516 in the illustrated embodiment includes multiple orifices 608 that direct air into the cavity 228. The orifices 608 of each of the inlet ports 516 are arranged in a row 610 along a length of the pet storage module 202 (e.g., parallel to the longitudinal axis 193). The orifices 608 of the inlet ports 516 optionally may provide an air knife effect by directing air into the cavity 228 in uniform, streamline flow trajectories.

In the illustrated embodiment, one of the inlet ports 516 is located along an upper portion 606 of the front wall 226F of the housing 224, which extends from the door 206 to the top wall 226C. The other inlet port 516 is located along a lower portion 607 of the front wall 226F of the housing 224 that extends from the door 206 to the bottom wall 226A. The orifices 608 are defined through the upper and lower portions 606, 607. The upper and lower portions 606, 607 optionally may be oriented at oblique angles relative to the door 206 and the top and bottom walls 226C, 226A.

In at least one embodiment, the orifices 608 of the inlet ports 516 are angled and/or curved in order to redirect a path of air flow into the cavity 228. The orifices 608 are directionally-oriented. For example, air supplied from the air source 502 (FIG. 7) may be directed across the front end 220 of the pet storage module 202 in a generally parallel direction relative to the front end 220. In the illustrated embodiment, a feed air stream 611 flows along the longitudinal axis 193 through feed air channels 612. The feed air channels 612 may be defined within the pet storage module 202, or alternatively within the monument 103 (e.g., the closet 104) of the passenger cabin 102 that holds the pet storage module 202. As the feed air stream 611 flows past the orifices 608, at least some of the air is collected and redirected by the orifices 608 into the cavity 228 to flow towards the exhaust port 518.

Figure 9:
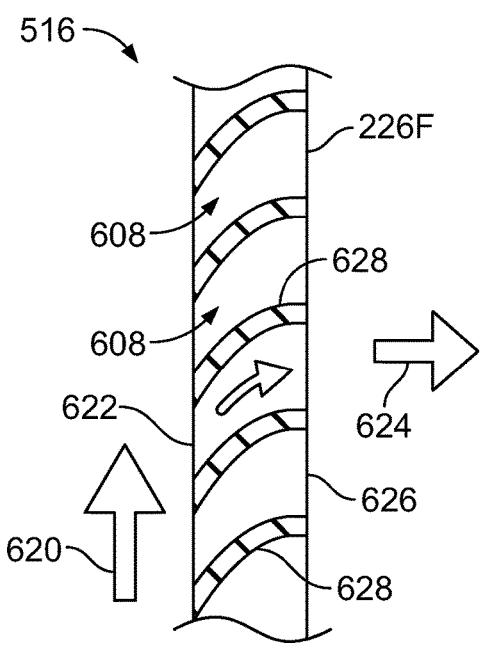
FIG. 9 is a top-down cross-sectional illustration of a portion of an inlet port of the pet storage module according to an embodiment of the present invention.

FIG. 9 is a top-down cross-sectional illustration of a portion of the inlet port 516 in the front wall 226F of the pet storage module 202 (FIG. 8) according to an embodiment of the present invention. The inlet port 516 includes multiple orifices 608 that redirect air from a first direction 620 outside of an outer surface 622 of the front wall 226F to a second direction 624 as the air is discharged beyond an inner surface 626 of the front wall 226F into the cavity 228 (shown in FIG. 8). In the illustrated embodiment, the orifices 608 may be defined by curved vanes 628 that are fixed in place on the front wall 226F.

Figure 10:
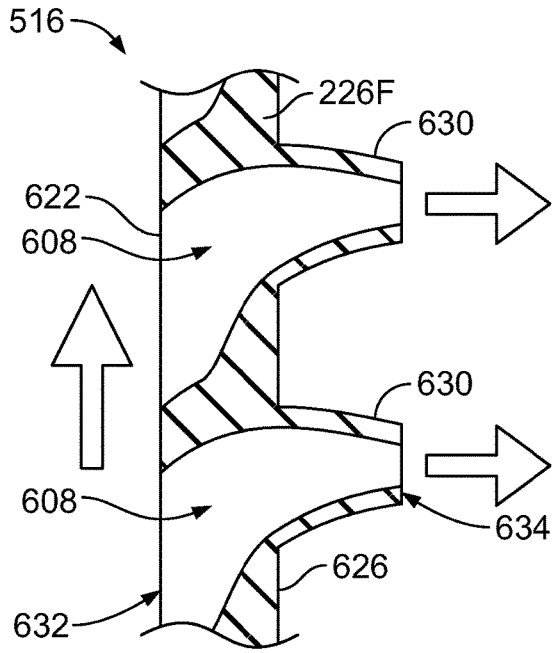
FIG. 10 is a top-down cross-sectional illustration of the portion of the inlet port of the pet storage module according to another embodiment of the present invention.

FIG. 10 is a top-down cross-sectional illustration of a portion of an inlet port 516 of the pet storage module 202 (FIG. 8) according to another embodiment of the present invention. In the illustrated embodiment, the orifices 608 are individual nozzles 630. The nozzles 630 have nozzle inlets 632 that receive air from the air source 502 (FIG. 7) and nozzle outlets 634 that discharge the air into the cavity 228

(FIG. 8) of the pet storage module 202. The nozzle inlets 632 have greater diameters than the nozzle outlets 634 such that the air is discharged at a greater velocity and/or pressure than the air that is received into the nozzles 630 at the nozzle inlets 632. In the illustrated embodiment, the nozzle inlets 632 are disposed along the outer surface 622 of the front wall 226F, and the nozzles 630 project beyond the inner surface 626 to the nozzle outlets 634.

Figure 11:
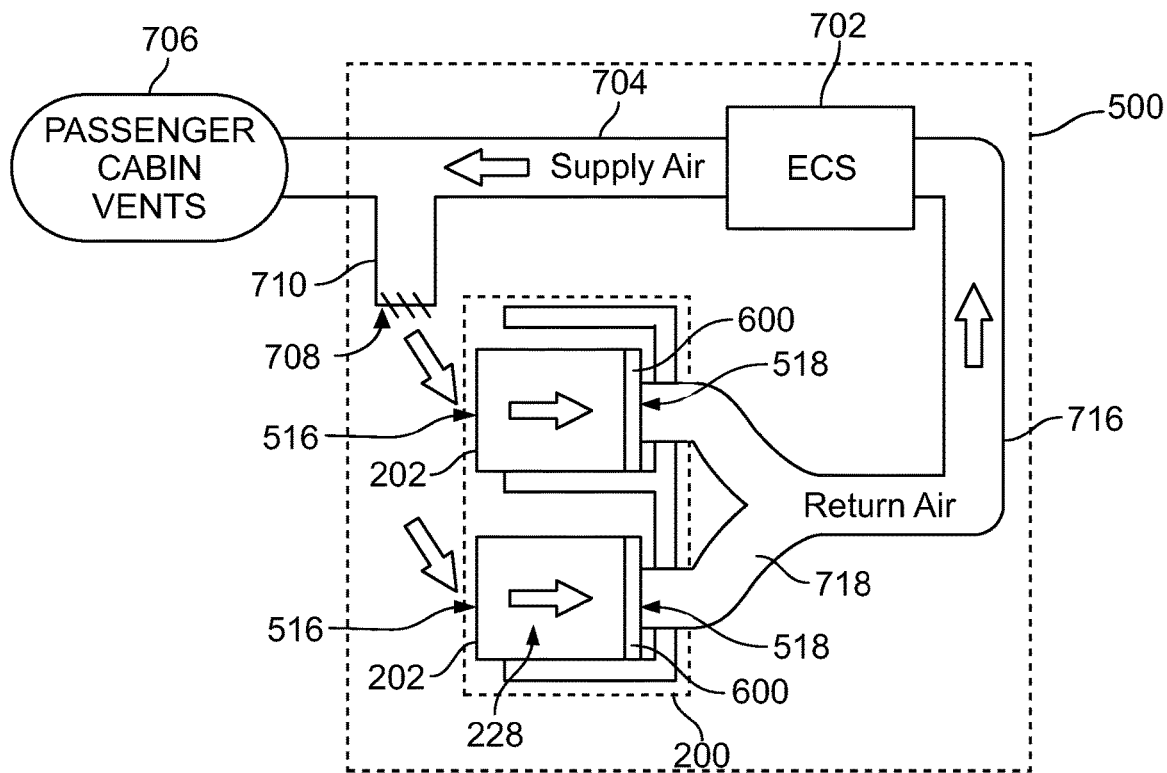
FIG. 11 is a schematic diagram of the ventilation system of the vehicle for use with the pet travel system according to an embodiment of the present disclosure.

FIG. 11 is a schematic diagram of the ventilation system 500 of the vehicle 100 for use with the pet travel system 200 according to an embodiment of the present disclosure. In the illustrated embodiment, an environmental control system (ECS) 702 of the vehicle 100 (or at least a branch duct 710 of the environmental control system 702) represents the air source 502 (shown in FIG. 7) that supplies air to the pet travel system 200. The environmental control system 702 is part of the ventilation system 500 in the illustrated embodiment. The environmental control system 702 includes various heating, ventilation, and air conditioning components that receive a supply of bleed air from one or more engines of the vehicle 100 and condition the air by heating, cooling, humidifying, or the like. The environmental control system 702 includes ductwork 704 that distributes the conditioned air to various places within the vehicle 100. At least some of the conditioned air may be distributed to passenger cabin vents 706 that supply the conditioned air into the passenger cabin 102 (FIG. 3) to provide air movement and comfort for the passengers. The environmental control system 702 may also include air movers, such as fans and/or blowers, to force the air through the ductwork 704.

The pet travel system 200 (including the pet storage modules 202 thereof) may receive conditioned supply air from the environmental control system 702 through an outlet 708 in a branch duct 710 of the ductwork 704. The branch duct 710 may direct the supply air at least partially towards the pet storage modules 202 of the pet travel system 200. The conditioned air from the branch duct 710 is directed into the pet storage modules 202 through the inlet ports 516. The air within the pet storage modules 202 penetrates the filters 600 therein before being discharged through the exhaust ports 518.

In the illustrated embodiment, a return duct 716 of the environmental control system 702 represents the exhaust duct 504 (shown in FIG. 7) of the ventilation system 500. For example, the return duct 716 is in flow communication with the exhaust ports 518 of the pet storage modules 202 via a manifold 718. The manifold 718 collects the air that is discharged from pet storage modules 202. The return duct 716 directs the collected air to the components of the environmental control system 702 to recycle the air. In at least one embodiment, the pressure within the return duct 716 may be lower than the pressure of the branch duct 710, which establishes a pressure differential that causes air to flow through the pet storage modules 202. The collected air from the pet storage modules 202 may not overly tax filters of the environmental control system 702 with pet hair and particulates because the filters 600 within the pet travel system 200 entrap the pet hair and particulates prior to the air being discharged into the return duct 716.

Figure 12:
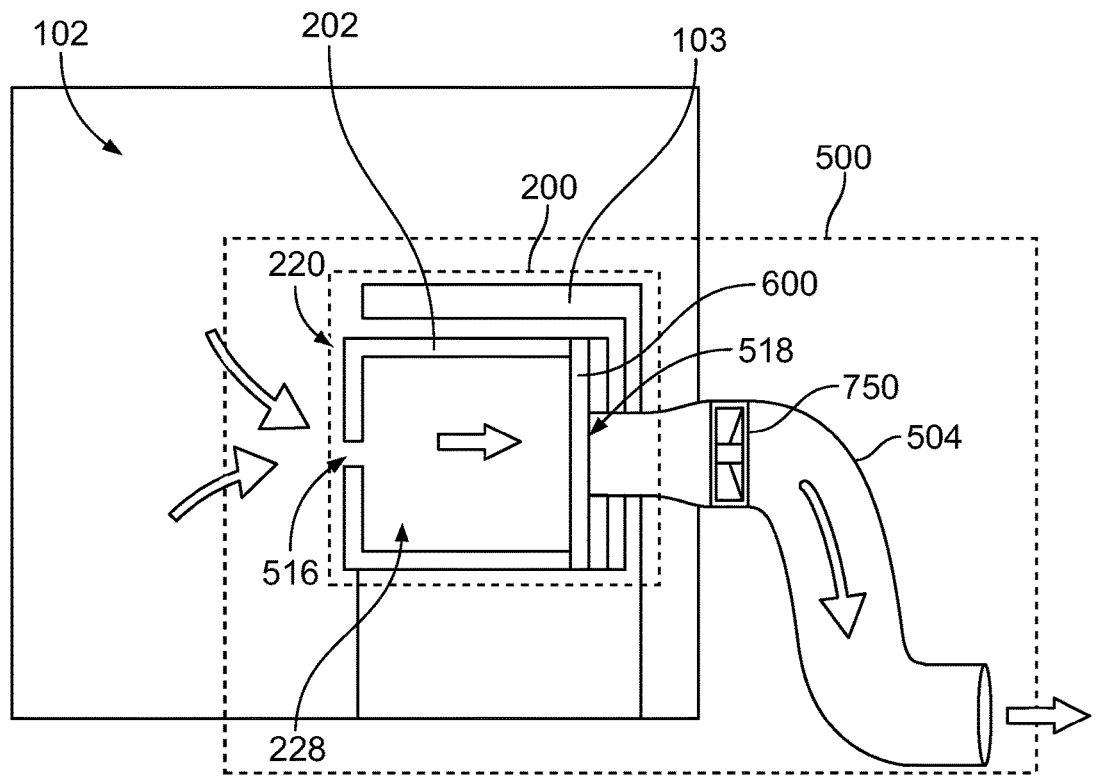
FIG. 12 is a schematic diagram of the ventilation system of the vehicle for use with the pet travel system according to another embodiment of the present disclosure.

FIG. 12 is a schematic diagram of the ventilation system 500 of the vehicle 100 for use with the pet travel system 200 according to another embodiment of the present disclosure. In the illustrated embodiment, the ventilation system 500 includes a fan 750 that is actively powered by battery or an electrical system on the vehicle 100. For example, the fan 750 may be electrically connected to a power system (not shown) on the vehicle 100, such as by plugging a power cable of the fan 750 into an electrical outlet of the vehicle 100. The fan 750 may be any type of air modulator. The fan 750 is configured to force or draw air through the pet travel system 200 and into the exhaust duct 504.

The fan 750 is outside of the pet travel system 200, such that the fan 750 is outside of both the pet storage module 202 and the monument 103 that holds the pet storage module 202. In the illustrated embodiment, the fan 750 is disposed within the exhaust duct 504, which is in flow communication with the exhaust port 518 of the pet storage module 202. The fan 750 configured to blow air in a direction away from the pet storage module 202, which creates a low pressure region (e.g., vacuum) that draws air from the passenger cabin 102 into the cavity 228 of the pet storage module 202 through the inlet port 516. Thus, the fan 750 produces a pressure differential that causes air to flow through the cavity 228 and penetrate the filter 600 before exiting through the exhaust port 518. In the illustrated embodiment, the passenger cabin 102 represents the air source 502 (shown in FIG. 7), because the air from the passenger cabin 102 is drawn into and through the pet storage module 202. The air within the exhaust duct 504 is filtered, and may be either exhausted from the vehicle 100, discharged back into the passenger cabin 102, cycled to the environmental control system 702 (FIG. 11) of the vehicle 100, or the like.

In at least one other embodiment, the fan 750 may be mounted in the passenger cabin 102 in front of the front end 220 of the pet storage module 202, such that the fan 750 blows or pushes the air from the passenger cabin 102 towards the inlet port 516 (instead of creating a vacuum that draws air into the inlet port 516).

Figure 13:
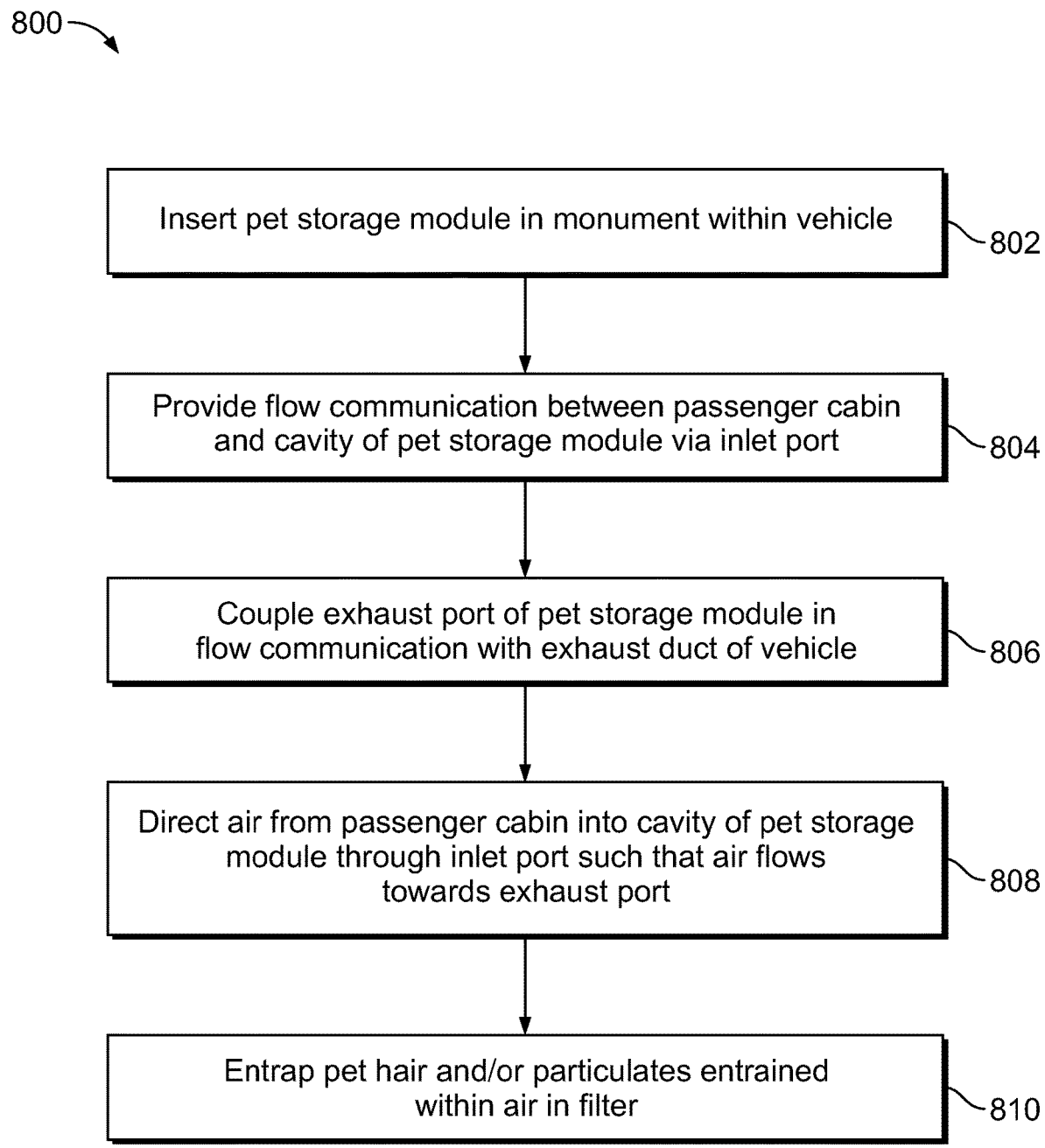
FIG. 13 is a flow chart of a method for traveling with a pet on a vehicle having a monument within a passenger cabin, according to an embodiment of the present disclosure.

FIG. 13 is a flow chart of a method 800 for traveling with a pet on a vehicle having a monument within a passenger cabin, according to an embodiment of the present disclosure. The method 800 may be performed using one or more of the embodiments of the vehicle 100 and the ventilation system 500 of the vehicle 100 described herein with reference to FIGS. 3-12. The vehicle 100 may be the aircraft 10 shown in FIGS. 1 and 2. At step 802, a pet storage module 202 is inserted in a portion of a monument 103 within a passenger cabin 102 of a vehicle 100. The monument 103 may be, or include, a closet 104, a rest bunk, or the like. The portion of the monument 103 may include a compartment 114 or other opening sized to accommodate the pet storage module 202. The vehicle 100 may be the aircraft 10, a rail vehicle, a marine vessel, a bus, or the like. A pet may be loaded into a cavity 228 of the pet storage module 202 before or after inserting the pet storage module 202 into the portion of the monument 103.

At step 804, flow communication is provided between the passenger cabin 102 and the cavity 228 of the pet storage module 202 via an inlet port 516 defined in the pet storage module 202. The inlet port 516 may include one or more orifices 608 defined through a front wall 226F or a door 206 of the pet storage module 202 at a front end 220 thereof. The passenger cabin 102 may represent an air source from which air is directed into the cavity 228 through the inlet port 516.

At step 806, an exhaust port 518 of the pet storage module 202 is coupled in flow communication with an exhaust duct 504 of the vehicle 100. The exhaust port 518 may be an opening defined through a rear wall 226B of the pet storage module 202. The exhaust duct 504 is located outside of the pet storage module 202. The exhaust duct 504 may be an air handler, such as ductwork, that guides air flow along a defined path. In at least one embodiment, the exhaust duct 504 may be a return duct 716 of an environmental control system 702 of the vehicle 100 that conditions air for the passenger cabin 102. Alternatively, the exhaust duct 504 may extend to an outlet that expels air from the vehicle 100 or discharges air into the passenger cabin 102 or another area of the vehicle 100, such as a cargo area. The pressure within the exhaust duct 504 is lower than the pressure in the passenger cabin 102 to cause air to flow from the passenger cabin 102 through the pet storage module 202 from the inlet port 516 to the exhaust port 518.

At step 808, air is directed from the passenger cabin 102 into the cavity 228 of the pet storage module 202 through the inlet port 516 such that the air flows towards the exhaust port 518. The air may be directed from the passenger cabin 102 into the cavity 228 due to a pressure differential between the exhaust duct 504 and the passenger cabin 102. The air may be propelled by a fan 750 that is located outside of the pet storage module 202, such as in the passenger cabin 102 or in the exhaust duct 504. Optionally, the orifices 608 of the inlet port 516 may be directionally-oriented to redirect air flowing across or along the front end 220 of the pet storage module 202 into the cavity 228 towards the exhaust port 518.

At step 810, pet hair and particulates entrained within the air that flows through the cavity 228 of the pet storage module 202 are entrapped in a filter 600 of the ventilation system 500. The filter 600 may be held by the pet storage module 202. The pet hair and particulates are picked up by the air from the cavity 228 and/or the pet as the air flows through the cavity 228. In other embodiments, the filter 600 may be secured onto the monument 103 behind the pet storage module 202 or may be located within the exhaust duct 504. By entrapping the pet hair and particulates from the air, the air that exits the filter 600 may be recycled back to the environmental control system 702, to the passenger cabin 102, or the like, without a risk that pet hair and particulates in the air will disturb and/or irritate passengers or overly tax filters of the environmental control system 702.

As described herein, embodiments of the present disclosure provide vehicles, ventilation systems, and methods for transporting pets onboard a vehicle, such as but not limited to a commercial aircraft. The vehicles, ventilation systems, and methods are configured to allow pets to travel within a passenger cabin of the vehicle without being stowed underneath passenger seats and without disturbing other passengers. The vehicles, ventilation systems, and methods are also configured to provide the pets various amenities to reduce stress and anxiety of the pets during the trip. Embodiments of the present disclosure occupy an existing monument on the vehicle, such as a closet or a rest bunk, without requiring removal of passenger seats or other renovations to the cabin of the vehicle.

One or more embodiments described herein provide a vehicle 100 that includes a passenger cabin 102, a monument 103 within the passenger cabin 102, a pet travel system 200, and a ventilation system 500 for ventilating the pet travel system 200. The pet travel system 200 includes a portion of the monument 103 and one or more pet storage modules 202. Each pet storage module 202 defines an inlet port 516 and an exhaust port 518. The inlet and exhaust ports 518 of the pet storage modules 202 may represent components of the ventilation system 500 along with an exhaust duct 504 of the vehicle 100. The ventilation system 500 may also include a filter 600 disposed within the pet travel system 200 (such as on the pet storage module 202 or the monument 103) or within the exhaust duct 504. Optionally, the ventilation system 500 may include an air mover, such as a fan 750 and/or components of an environmental control system 702 of the vehicle 100.

While various spatial and directional terms, such as top, bottom, front, rear, lateral, horizontal, vertical, and the like, may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein". Moreover, the terms "first", "second", and "third", etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A vehicle comprising:
   a passenger cabin;
   a monument;
   a pet travel system comprising at least a portion of the monument and at least one pet storage module configured to be received in the portion of the monument; and
   a ventilation system comprising:
      an inlet port defined in the at least one pet storage module, the inlet port being in flow communication with an air source outside of the pet travel system;
      an exhaust port defined in the at least one pet storage module; and
      a return duct of an environmental control system of the vehicle, wherein the return duct is in flow communication with the exhaust port, and pressure within the return duct is lower than the pressure of the air source to cause air to flow from the air source through the at least one pet storage module from the inlet port to the exhaust port.

2. The vehicle of claim 1, wherein the portion of the monument is one of a closet or a rest bunk within the passenger cabin.

3. The vehicle of claim 1, wherein the at least one pet storage module includes a housing that defines a cavity and a filter removably mounted to the housing and extending across the cavity, the filter disposed adjacent to the exhaust port such that the air that flows through the cavity from the inlet port penetrates the filter before exiting the cavity through the exhaust port, the filter configured to entrap one or more of pet hair or particulates entrained within the air.

4. The vehicle of claim 1, wherein the inlet port of the at least one pet storage module includes multiple orifices arranged in a row along a length of the at least one pet storage module at a front end of the at least one pet storage module.

5. The vehicle of claim 4, wherein the orifices are one or more of angled or curved to redirect air from the air source that flows across the front end of the at least one pet storage module into the at least one pet storage module and towards the exhaust port.

6. The vehicle of claim 4, wherein the orifices are nozzles configured to receive air from the air source through respective nozzle inlets and discharge the air from the nozzles through respective nozzle outlets into the at least one pet storage module, wherein the nozzle inlets have greater diameters than the nozzle outlets.

7. The vehicle of claim 1, wherein the ventilation system includes a fan outside of the portion of the monument, wherein the air source is the passenger cabin and the fan is configured to force or draw air from the passenger cabin through the inlet port into the at least one pet storage module.

8. The vehicle of claim 1, wherein the air source is the environmental control system of the vehicle, and the inlet port receives air from the environmental control system through an outlet in a duct.

9. A vehicle comprising:
   a passenger cabin;
   a monument
   a pet travel system comprising at least a portion of the monument and at least one pet storage module configured to be received in the portion of the monument; and
   a ventilation system comprising:
      an inlet port defined in the at least one pet storage module, the inlet port being in flow communication with an air source outside of the pet travel system;
      an exhaust port defined in the at least one pet storage module;
      an exhaust duct in flow communication with the exhaust port; and
      a fan disposed outside of the portion of the monument and within the exhaust duct, wherein the air source is the passenger cabin and the fan is disposed within the exhaust duct and is configured to draw air from the passenger cabin through the inlet port into the at least one pet storage module.

10. A ventilation system for use with a vehicle having a pet travel system, wherein an air source is outside of the pet travel system, the ventilation system comprising:
    an inlet port defined within the pet travel system and in flow communication with the air source;
    an exhaust port defined within the pet travel system; and
    an exhaust duct outside of the pet travel system, the exhaust duct being in flow communication with the exhaust port of the pet travel system through an opening in a back wall of a closet within the vehicle, the opening in the back wall aligning with the exhaust port of the pet travel system when the pet travel system is located within the closet, wherein pressure within the exhaust duct is lower than the pressure of the air source to cause air to flow from the air source through the pet travel system from the inlet port to the exhaust port.

11. The ventilation system of claim 10, further comprising a fan disposed outside of the pet travel system within a passenger cabin of the vehicle, the fan configured to force air from the passenger cabin through the inlet port into the pet travel system.

12. The ventilation system of claim 10, further comprising a fan disposed within the exhaust duct, the fan configured to draw air from a passenger cabin of the vehicle through the inlet port into the pet travel system.

13. The ventilation system of claim 10, wherein the air source is an environmental control system of the vehicle that distributes air along the vehicle within ductwork, wherein the inlet port is in flow communication with the environmental control system through an outlet in a branch duct of the ductwork.

14. The ventilation system of claim 13, wherein the exhaust duct is a return duct of the environmental control system of the vehicle.

15. The ventilation system of claim 10, further comprising a filter disposed within the pet travel system, the filter disposed adjacent to the exhaust port between the exhaust port and the inlet port such that air that flows through the pet travel system from the inlet port penetrates the filter before flowing through the exhaust port, the filter configured to entrap one or more of pet hair or particulates entrained within the air.

16. The ventilation system of claim 10, wherein the exhaust port of the pet travel system is in flow communication with the exhaust duct via a manifold that connects the exhaust duct to the exhaust port.

17. A method for traveling with a pet on a vehicle having a monument within a passenger cabin, the method comprising:
    inserting a pet storage module in a compartment of the monument so that the pet storage module is held within the compartment during a trip of the vehicle;
    providing flow communication between the passenger cabin and a cavity of the pet storage module via an inlet port defined in the pet storage module; and
    coupling an exhaust port of the pet storage module in flow communication with a return duct of an environmental control system of the vehicle, wherein pressure within the return duct is lower than the pressure in the passenger cabin to cause air to flow from the passenger cabin through the pet storage module from the inlet port to the exhaust port.

18. The method of claim 17, further comprising entrapping one or more of pet hair or particulates entrained within air in a filter that is held by the pet storage module, the filter disposed adjacent to the exhaust port and between the exhaust port and the inlet port such that air that flows through the pet storage module from the inlet port penetrates the filter before flowing through the exhaust port.

19. The method of claim 17, further comprising directing air from the passenger cabin into the cavity of the pet storage module through the inlet port such that the air flows towards the exhaust port.

20. The method of claim 17, wherein inserting the pet storage module in the compartment of the monument comprises inserting the pet storage module into one of a closet or a rest bunk in the vehicle.

* * * * *